March 18, 1952 L. F. MAYLE 2,589,270

ELECTRONIC TIMING CIRCUIT

Filed May 31, 1946 2 SHEETS—SHEET 1

INVENTOR
LOUIS F. MAYLE

BY [signature]

ATTORNEY

March 18, 1952 L. F. MAYLE 2,589,270

ELECTRONIC TIMING CIRCUIT

Filed May 31, 1946 2 SHEETS—SHEET 2

INVENTOR
LOUIS F. MAYLE

BY [signature]

ATTORNEY

Patented Mar. 18, 1952

2,589,270

UNITED STATES PATENT OFFICE 2,589,270

ELECTRONIC TIMING CIRCUIT

Louis F. Mayle, Fort Wayne, Ind., assignor, by mesne assignments, to Farnsworth Research Corporation, a corporation of Indiana Application May 31, 1946, Serial No. 673,359

13 Claims. (Cl. 250—27)

This invention relates to timing circuits, and particularly relates to an electronic circuit arranged for developing an output signal in response to a triggering pulse occurring at any time after a precisely determined interval of time.

The electronic timing circuit of the present invention includes as an essential element an impulse counter which permits a high count-down ratio. A conventional impulse counter comprises a charging condenser and a storage condenser connected in series through a diode. Accordingly, an input pulse applied to the charging condenser will charge the storage condenser through the diode. Between successive pulses the charging condenser is brought to a fixed potential, such as ground, and therefore, the voltage increments applied to the storage condenser in response to successive input pulses decrease exponentially so that the voltage across the storage condenser approaches gradually the peak voltage of the input pulses. Consequently, the voltage which can be built up across the storage condenser is limited by the voltage of the input pulses which usually is of the order of 100 volts, thus necessitating amplification of the input signal.

A serious drawback of conventional impulse counters, however, is the decrease of successive voltage increments applied across the storage condenser. Usually the storage condenser is discharged after a predetermined number of input pulses by a triggering device, such as a discharge tube which operates by amplitude selection. Thus the last voltage increment applied to the storage condenser must exceed a certain value in order to assure that the triggering device will be actuated after a predetermined number of input pulses. This requirement limits the count-down ratio available with conventional impulse counters to the order of ten to one. A counter circuit where successive voltage increments applied to the storage condenser are equal would therefore have no theoretical limit of the count-down ratio obtainable with such a circuit.

Electronic timing circuits are widely used for opening or closing a relay such, for example, as a space discharge tube. The circuit of the present invention includes an impulse counter of high count-down ratio and is adapted to develop an output signal or timed pulse in response to a selected triggering pulse occurring after a precisely determined interval of time. This circuit may be used either for transmitting pulses occurring during this interval of time, while suppressing one pulse occurring after the time interval, or alternatively for suppressing pulses occurring during this interval of time, while transmitting one pulse occurring thereafter. Thus, from a series of pulses every $n$th pulse may be suppressed which may, for example, be an undesired synchronizing pulse. Alternatively, every $n$th pulse may be transmitted, while $(n-1)$ pulses of a series of pulses are suppressed. Other applications of the present timing circuit will readily suggest themselves to those skilled in the art.

It is the principal object of the present invention, therefore, to provide an electric timing circuit which will develop an output signal or timed impulse in response to a selected triggering pulse occurring after an accurately determined interval of time.

Another object of the invention is to provide a circuit which will develop, after a predetermined interval of time determined by the counting cycle of an impulse counter and in response to a triggering pulse, an output signal which may be utilized, for example, for opening a normally closed gate tube, or for closing a normally open gate tube.

A further object of the invention is to provide an electric circuit arranged either for suppressing pulses occurring during a precisely determined interval of time, while transmitting a pulse occurring after that time interval, or for transmitting pulses occurring during that time interval while suppressing a pulse occurring after the interval.

A still further object of the invention is to provide an electronic timer including a counter circuit for accurately determining a time interval during which triggering pulses will be ineffective for developing an output signal.

In accordance with the present invention, there is provided an electronic timing circuit comprising a first source of counting pulses, a first potential storage element coupled to the first pulse source and a second potential storage element coupled to the first storage element. Means are provided which are controlled by the storage elements for raising the potential of the second storage element in response to the counting pulses by equal increments. A second source of triggering pulses is provided and means are provided for discharging the second storage element to a predetermined potential. This discharging means is rendered operative when a predetermined number of counting pulses is stored and is triggered by a triggering pulse which arrives after the discharging means has been rendered operative. A utilization device is finely provided which is responsive to the triggering of the discharging means. The utilization device may, for example, comprise a normally closed gate tube which is momentarily opened when the discharging means is triggered. Alternatively, the utilization device may include a normally open gate tube which is momentarily closed when the discharging means is triggered.

For a better understanding of the invention, together with other and further objects thereof, reference is made to the following description, taken in connection with the accompanying drawings, and its scope will be pointed out in the appended claims.

Figure 1:
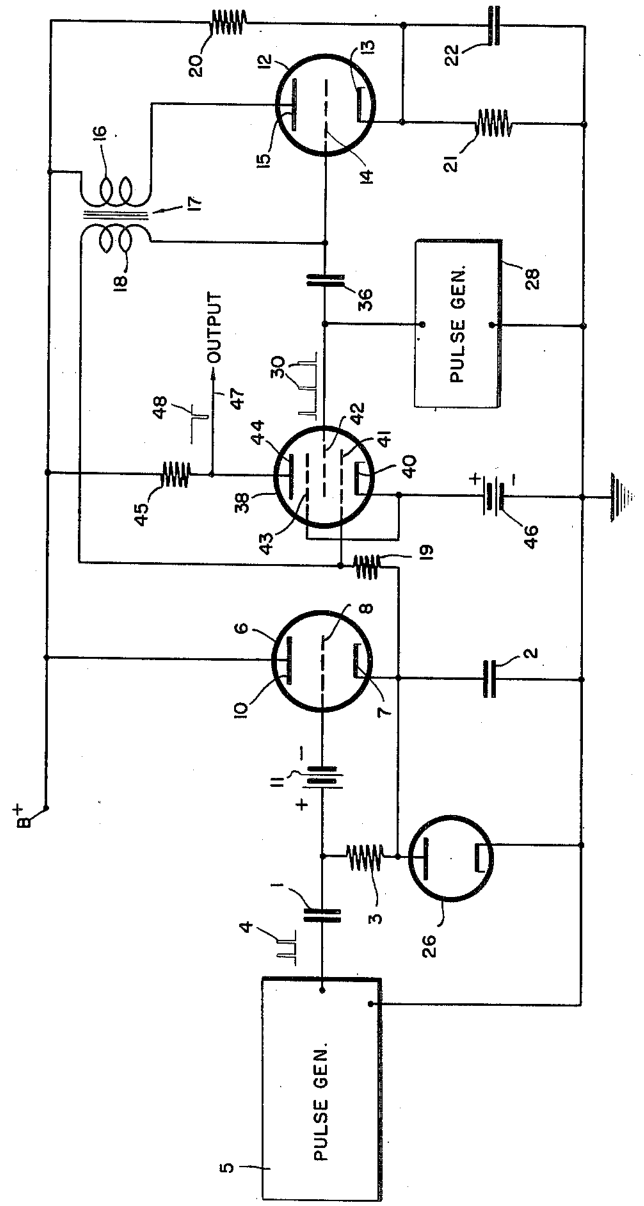
Fig. 1 is a circuit diagram of an electronic timing circuit embodying the invention and arranged for opening a normally closed gate tube in response to a triggering pulse arriving after a predetermined interval of time.

Referring now to Fig. 1, there is illustrated an electronic timing circuit including an impulse counter for accurately determining a time interval. The impulse counters forming part of the circuits illustrated in Figs. 1 and 3 have been disclosed and claimed in copending patent application to L. F. Mayle filed on April 29, 1946, Serial Number 665,659, now U. S. Patent No. 2,583,003 dated January 22, 1952. The impulse counter which forms part of the electronic timing circuit of Fig. 1 comprises charging condenser 1 and storage condenser 2 connected in series through resistor 3. Storage condenser 2 is connected between resistor 3 and ground, as illustrated. For the purpose of impressing counting pulses of positive polarity, indicated at 4, on charging condenser 1, there is provided pulse generator 5.

For the purpose of charging storage condenser 2 by substantially equal voltage increments, there is provided space discharge tube 6 comprising cathode 7, control grid 8 and anode 10 which may be connected to a suitable anode voltage source indicated at B+. A suitable grid bias voltage source, such as battery 11, may be provided between control grid 8 and cathode 7 so that discharge tube 6 is normally biased beyond cut-off.

For the purpose of driving storage condenser 2 to a predetermined negative potential, there is provided blocking oscillator 12 comprising cathode 13, control grid 14 and anode 15. Anode 15 is connected through winding 16 of transformer 17 to anode voltage source B+. The other winding 18 of transformer 17 is connected through resistor 19 between cathode 7 of discharge tube 6 and control grid 14 of blocking oscillator 12. Blocking oscillator 12 is normally biased beyond cut-off by means of a voltage divider including resistor 20 arranged between anode voltage source B+ and cathode 13 of blocking oscillator 12 and cathode resistor 21 which may be bypassed by blocking condenser 22. Accordingly, the potential of cathode 13 is kept above ground, so that blocking oscillator 12 becomes conductive only when the voltage impressed upon its control grid 14 is positive.

The counter circuit just described operates as follows. Let it be assumed that blocking oscillator 12 fires so that initially storage condenser 2 is driven to a high negative potential which may be of the order of −500 volts. This negative charge is impressed upon storage condenser 2 through resistor 19. Since charging condenser 1 and storage condenser 2 are connected through resistor 3, the voltages on condensers 1 and 2 will equalize so that both condensers will acquire a high negative voltage. Control grid 14 of blocking oscillator 12 is held at this negative voltage by storage condenser 2 so that the blocking oscillator ceases to conduct space current. In view of the bias voltage impressed by bias battery 11 between control grid 8 and cathode 7 of discharge tube 6, discharge tube 6 is also cut off.

Upon the arrival of the leading edge of the first counting pulse 4, which is of positive polarity, the voltage of charging condenser 1 is raised toward ground, thereby driving control grid 8 positive with respect to cathode 7. Discharge tube 6 will accordingly begin to conduct space current and will discharge storage condenser 2. While tube 6 conducts space current, the voltage of storage condenser 2 is raised toward ground until discharge tube 6 ceases again to conduct space current. Tube 6 is very quickly cut off again, preferably before the arrival of the trailing edge of the counting pulse. During this time a small portion of the charge of charging condenser 1 leaks off through resistor 3 into storage condenser 2.

It will accordingly be seen that the conduction of discharge tube 6 is controlled by the voltages across charging condenser 1 and storage condenser 2. Counting pulses 4 only trigger discharge tube 6, while the major portion of the energy supplied to storage condenser 2 is furnished by the space current through tube 6.

Immediately after the arrival of the trailing edge of the first counting pulse 4, the voltage across charging condenser 1 is depressed again to its initial voltage, thus driving control grid 8 considerably beyond cut-off since the cathode 7 is now less negative. The voltage at the junction point of charging condenser 1 and resistor 3 is negative with respect to that of the junction point between resistor 3 and storage condenser 2. Accordingly, current will now flow from storage condenser 2 through resistor 3 to charging condenser 1 until the voltages of the two condensers are equal. Consequently, the voltage across storage condenser 2 will become more negative by a very small amount between the occurrence of the counting pulses, while simultaneously the voltage across charging condenser 1 will increase. To minimize the voltage drop across storage condenser 2 between successive counting pulses it is preferred, accordingly, to make the capacitance of storage condenser 2 large compared to that of charging condenser 1.

Figures 2, 3:
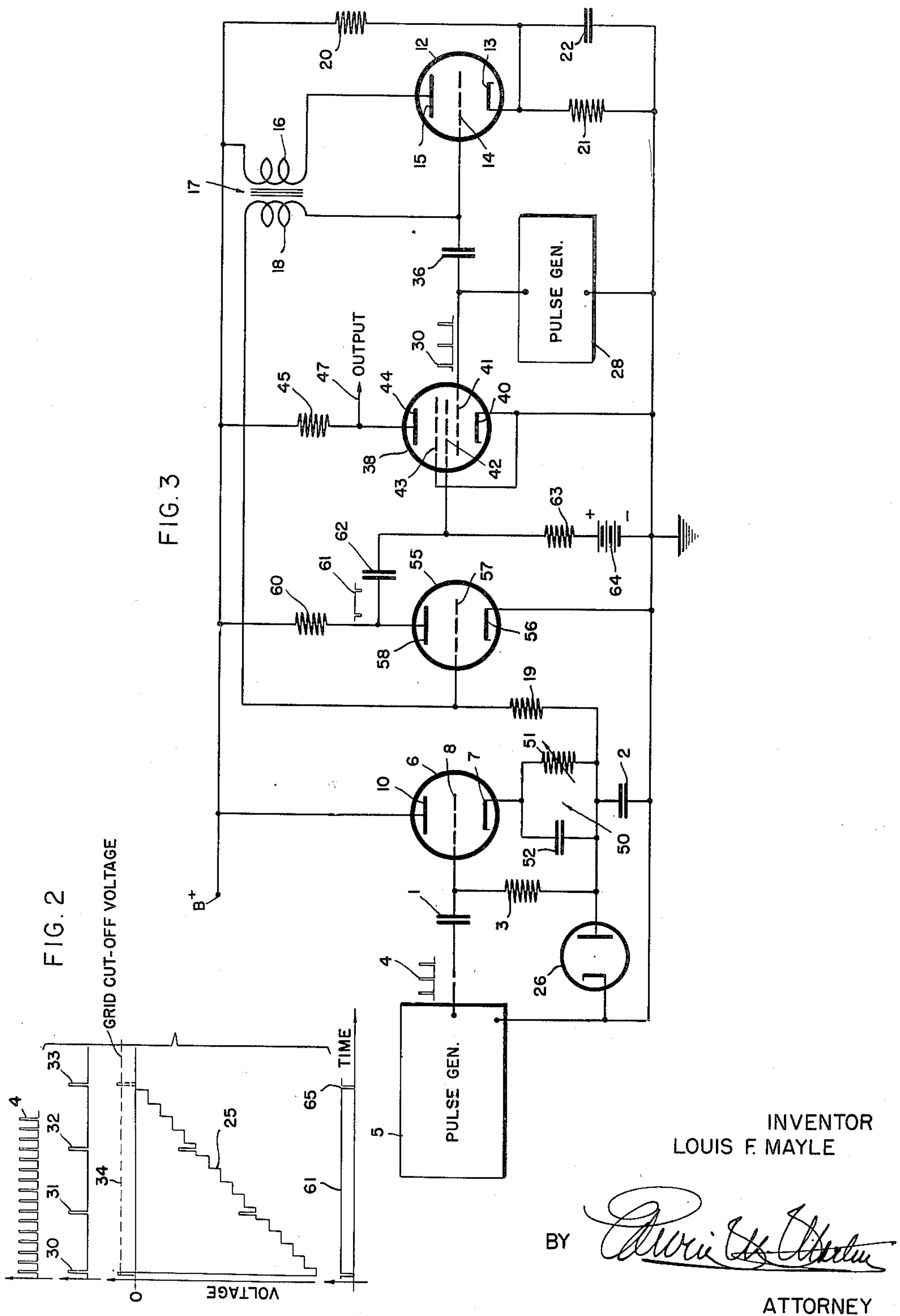
Fig. 2 is a graph illustrating voltages developed at different points of the timing circuit of the invention and plotted against time.
Fig. 3 is a modified timing circuit in accordance with the invention and arranged for closing a normally open gate tube in response to a triggering pulse arriving after a precisely determined interval of time.

In response to successive counting pulses the voltage across charging condenser 1 and storage condenser 2 will become less negative by substantially equal voltage increments as illustrated by curve 25 of Fig. 2 which illustrates the voltage across storage condenser 2 plotted against time. Counting pulses 4 developed by pulse generator 5 are also shown in Fig. 2.

After a predetermined number of counting pulses has been impressed upon charging condenser 1, the voltage across storage condenser 2 is raised to ground potential. However, the voltage across storage condenser 2 cannot become positive because diode 26 is connected across storage condenser 2. As soon as the voltage of storage condenser 2 tends to become positive, diode 26 becomes conductive, thereby preventing the voltage of storage condenser 2 from rising above ground.

Blocking oscillator 12 will accordingly be prevented from firing unless a special or triggering pulse is impressed upon its control grid 14 which will raise its potential sufficiently to initiate conduction of space current. To this end there is provided triggering pulse generator 28 which develops triggering pulses indicated generally at 30 in Figs. 1 and 2. As illustrated in Fig. 2 triggering pulses 31 and 32 will be ineffective for firing blocking oscillator 12, the grid cut-off voltage of which is shown by dotted line 34. At the end of the counting cycle of the impulse counter, blocking oscillator 12 is in an operative position, that is, the potential impressed upon its control grid 14 is 0 as indicated in Fig. 2. A triggering pulse 33 which occurs at any time at or after the end of the counting cycle of the impulse counter will be effective for firing blocking oscillator 12, since triggering pulse generator 28 is coupled to control grid 14 of blocking oscillator 12 by blocking condenser 36. Resistor 19 arranged between winding 18 of transformer 17 and the junction point between cathode 7 and storage condenser 2 prevents triggering pulse 33 from passing through diode 26 before blocking oscillator 12 has fired.

Blocking oscillator 12 accordingly fires at or after the end of the counting cycle in response to a triggering impulse 33 developed by triggering pulse generator 28 which will lift the voltage of control grid 14 above the grid cut-off voltage. During a cycle of oscillation of blocking oscillator 12, a negative voltage is developed across transformer winding 18 which is impressed through resistor 19 upon storage condenser 2 and subsequently through resistor 3 upon charging condenser 1. The cycle of operation of the impulse counter of Fig. 1 is now complete.

The firing of blocking oscillator 12 may be utilized in accordance with the present invention for opening normally closed gate tube 38 which, as illustrated, may be a pentode. Gate tube 38 comprises cathode 40, control grid 41, screen grid 42, suppressor grid 43 and anode 44 which may be connected through anode resistor 45 to anode voltage source B+. Cathode 40 may be connected to ground through bias battery 46 so that gate tube 38 will be normally not conducting unless the potential impressed upon control grid 41 is raised above ground. Suppressor grid 43 may be connected to cathode 40 while control grid 41 may be connected through resistor 19 to the injunction point between cathode 7 of tube 6 and storage condenser 2. Screen grid 42 is connected to the output of triggering pulse generator 28.

During the counting cycle of the impulse counter, the potential impressed upon control grid 41 of gate tube 38 will be below or at ground potential. Accordingly, triggering pulses 31 and 32 will be ineffective for rendering gate tube 38 conductive. Triggering pulse 33, however, which occurs at or after the end of the counting cycle will be effective for firing gate tube 38. Triggering pulse 33 is impressed simultaneously upon screen grid 42 and upon control grid 41 through coupling condenser 36 and winding 18 of blocking oscillator 12. Resistor 19 again prevents triggering pulse 33 from being triggered through diode 26 before gate tube 38 has fired.

The electronic timing circuit of Fig. 1 may, therefore, be utilized for suppressing triggering pulses developed by pulse generator 28 which occur during the counting cycle of the impulse counter. On the other hand, a triggering pulse such as 33 which occurs at the end of the counting cycle or thereafter will be effective for triggering gate tube 38 so that this pulse is transmitted by the gate tube. At the same time this triggering pulse 33 is also effective for firing blocking oscillator 12 whereupon the next counting cycle is initiated. The triggering pulses developed by pulse generator 28 may have a regular or an irregular sequence. It is also to be understood that the impulse counter illustrated in Fig. 1 will operate equally well on a sinusoidal input wave as it does on positive counting pulses such as illustrated at 4.

An output signal or impulse may be developed across anode resistor 45 and may be obtained from output lead 47. The output signal indicated at 48 consists of negative pulses which are developed across anode resistor 45 when gate tube 38 becomes conductive.

Referring now to Fig. 3, in which like components are designated by the same reference numerals as were used in Fig. 1, there is illustrated a modified electronic timing circuit in accordance with the invention arranged for closing a normally open gate tube in response to a triggering pulse such as 33. The timing circuit again includes an impulse counter which is substantially identical to that illustrated in Fig. 1.

However, in the counter circuit of Fig. 3 bias battery 11 is replaced by self-bias impedance 50 comprising an adjustable resistor 51 and condenser 52 arranged in parallel between cathode 7 of tube 6 and storage condenser 2. The voltage increments developed by the counter circuit of Fig. 1 across storage condenser 2 are not perfectly equal in size, the voltage increments toward the end of the counting cycle being of smaller amplitude than the voltage increments at the beginning of the counting cycle. This is due to the fact that battery 11 provides a fixed bias voltage between control grid 8 and cathode 7 of tube 6. Actually, the grid cut-off voltage of tube 6 is dependent upon the plate-cathode voltage which varies over several hundred volts during a counting cycle.

By means of self-bias impedance 50 of the impulse counter of Fig. 3, the difference between the applied grid bias voltage and the grid cut-off voltage for any particular plate-cathode voltage may be kept constant because the current through resistor 51 decreases as the plate to cathode voltage decreases. Accordingly, it was found experimentally that the voltage increments developed by the counter circuit of Fig. 3 are of equal size throughout the counting cycle. Count-down ratios of 70 to 1 have been obtained with the impulse counter of Fig. 3.

The impulse counter of Fig. 3 operates in substantially the same manner as the circuit of Fig. 1. Gate tube 38 is arranged to be normally open and is momentarily closed at the end of the counting cycle in response to a triggering pulse 30 developed by pulse generator 28. To this end, there is provided clipper 55 comprising cathode 56, control grid 57 and anode 58 connected to anode voltage supply B+ through anode resistor 60. Cathode 56 is connected to ground, as illustrated, while control grid 57 is connected through resistor 19 to the junction point between self-bias impedance 50 and storage condenser 2. Clipper 55 will accordingly be normally not conductive, because the voltage impressed upon its control grid is at or below ground level.

However, at the end of the counting cycle when the voltage of control grid 57 is at ground potential, a triggering impulse such as 33 (Fig. 2) developed by pulse generator 28 is impressed upon control grid 57 through coupling condenser 36 and winding 18 to render clipper 55 conductive. Resistor 19 prevents the voltage impressed upon control grid 57 from being bypassed through diode 26 before clipper 55 has fired. The output voltage of clipper 55 is developed across anode resistor 60 and indicated at 61 in Figs. 2 and 3. Output signal 61 is impressed upon screen grid 42 of gate tube 38 through coupling condenser 62. Screen grid 42 is further provided with grid leak resistor 63 connected to the positive terminal of bias battery 64. Control grid 41 of gate tube 38 is connected to the output of triggering pulse generator 28.

Gate tube 38 is normally open or in operative condition because a positive potential is impressed upon its screen grid 42 through bias battery 64. Consequently, triggering pulses such as 31 and 32 which are developed by pulse generator 28 during the counting cycle of the impulse counter and which are impressed upon control grid 41 are transmitted by gate tube 38 and may be obtained from output lead 47. A triggering pulse such as 33 which occurs at the end of the counting cycle or thereafter will be effective for rendering clipper 55 conducting so that a negative pulse indicated at 65 in Fig. 2 is developed across anode resistor 60 and impressed upon screen grid 42. Gate tube 38 is accordingly rendered inoperative and will not transmit triggering pulse 33 which is impressed upon its control grid 41.

The electronic timing circuit of Fig. 3 may be utilized for suppressing every $n$th pulse developed by pulse generator 28, while the remaining pulses are transmitted by gate tube 38. Thus, a synchronizing pulse may be suppressed from a series of pulses. As stated previously, the electronic timing circuit of Fig. 1 may be utilized for transmitting every $n$th pulse developed by pulse generator 28, while $(n-1)$ pulses of a series are suppressed.

The electronic timing circuit of the invention provides an impulse counter for accurately determining an interval of time during which either gate tube 38 of Fig. 1 will remain closed, or during which gate tube 38 of Fig. 3 will remain open. This time interval is determined with great precision, because its accuracy is only dependent upon the deviations of the frequency of the counting pulses developed by pulse generator 28 from the assigned value. Since the impulse counter which forms part of the timing circuit of the invention permits very high count-down ratios, deviations in the length of the time interval of the counting cycle may be kept extremely small. The time duration of the counting cycle of the impulse counter is given by the frequency of the counting pulses and by the count-down ratio of the counter. Since both the frequency of the counting pulses and the count-down ratio may be varied over a wide range, the time duration of the counting cycle may be varied to suit any practical requirement.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electronic timing circuit comprising a first source of counting pulses, a first potential storage element coupled to said first source, a second potential storage element, galvanically connecting said first element to said second element, a space discharge tube including a control grid and a cathode individually coupled to said elements for lowering the potential of said second element in response to the counting pulses by substantially equal increments, a second source of triggering pulses, means coupled to said second source for charging said second element to a predetermined potential, said charging means being rendered operative when a predetermined number of counting pulses is stored and being triggered by a triggering pulse arriving after said charging means has been rendered operative, and a utilization device responsive to the triggering of said charging means.

2. An electronic timing circuit comprising a first source of counting pulses, a first electric storage element coupled to said first source, a second electric storage element, galvanically connecting said first element to said second element, a space discharge tube including a control grid and a cathode individually controlled by the voltages across said elements for decreasing the potential of said second element in response to the counting pulses by substantially equal increments, a second source of triggering pulses, means coupled to said second source for charging said second element to a predetermined potential, said charging means being rendered operative when the potential across said second element has reached a predetermined value and being triggered by a triggering pulse arriving after said charging means has been rendered operative, and a utilization device responsive to the triggering of said charging means.

3. An electronic timing circuit comprising a first source of counting pulses, a first electric storage element coupled to said first source, a second electric storage element, an impedance for galvanically connecting said elements, a space discharge tube including a control grid and a cathode individually controlled by the voltages across said elements for decreasing the potential of said second element during the occurrence of the counting pulses by substantially equal increments, a second source of triggering pulses, means coupled to said second source for charging said second element to a predetermined potential, said charging means being rendered operative when a predetermined number of counting pulses is stored by said second element and being triggered by a triggering pulse arriving after said charging means has been rendered operative, and a utilization device responsive to the triggering of said charging means.

4. An electronic timing circuit comprising a first source of counting pulses, a charging condenser coupled to said first source, a storage condenser galvanically connected to said charging condenser, a space discharge tube including a control grid and a cathode individually controlled by the voltages across said condensers for discharging said storage condenser by substantially equal voltage increments in response to the counting pulses, a second source of triggering pulses, a device coupled to said storage condenser and to said second source for impressing a predetermined potential upon said condensers, said device being rendered operative after a predetermined number of counting pulses from said first source is stored and being triggered thereafter by the arrival of a triggering pulse, and means responsive to the triggering of said device.

5. An electronic timing circuit comprising a first source of counting pulses, a charging condenser coupled to said first source, a storage condenser, an impedance for galvanically connecting said condensers, an auxiliary source of potential comprising a space discharge tube including a control grid and a cathode individually controlled by the voltages across said condensers for decreasing the potential of said storage condenser by substantially equal increments during the occurrence of the counting pulses, a second source of triggering pulses, a device coupled to said storage condenser and to said second source for impressing a predetermined potential upon said condensers, said device being rendered operative when the voltage across said storage condenser has reached a predetermined value and being triggered thereafter by the arrival of a triggering pulse, and means responsive to the triggering of said device.

6. An electronic timing circuit comprising a first source of counting pulses, a charging condenser coupled to said first source, a storage condenser coupled to said charging condenser, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, means for preventing said storage condenser from acquiring a potential which is lower than said predetermined value, said blocking oscillator being triggered by a triggering pulse occurring after said predetermined number of counting pulses is stored, and a utilization device responsive to the triggering of said blocking oscillator.

7. An electronic timing circuit comprising a first source of counting pulses, a charging condenser coupled to said first source, a storage condenser, an impedance for coupling said condensers, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined negative potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, a diode coupled to said storage condenser for preventing the potential of said storage condenser from being lower than said predetermined value, said blocking oscillator being triggered by a triggering pulse occurring after said predetermined number of counting pulses is stored, and a utilization device responsive to the triggering of said blocking oscillator.

8. An electronic timing circuit comprising a first source of counting pulses, a charging condenser coupled to said first source, a storage condenser coupled to said charging condenser, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined negative potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, a diode connected across said storage condenser for preventing the potential thereof from being lower than said predetermined value, said blocking oscillator being triggered by a triggering pulse occurring after said predetermined number of counting pulses is stored, and a gate tube responsive to the triggering of said blocking oscillator.

9. An electronic timing circuit comprising a first source of counting pulses, a charging condenser coupled to said first source, a storage condenser coupled to said charging condenser, means controlled by the voltages across said condensers for discharging said storage condenser by substantially equal voltage increments in response to the counting pulses, a second source of triggering pulses, a device coupled to said storage condenser and to said second source for impressing a predetermined negative potential upon said condensers, said device being rendered operative when the voltage across said storage condenser has reached a predetermined value and being triggered thereafter by the arrival of a triggering pulse, and a gate tube having two contol grids, one of said grids being coupled to said second source, the other one of said grids being coupled to said storage condenser, said gate tube being normally not conducting and being rendered conducting when said device is triggered, thereby to transmit through said gate tube the triggering pulse which triggers said device.

10. An electronic timing circuit comprising a first source of counting pulses, a charging condenser coupled to said first source, a storage condenser coupled to said charging condenser, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined negative potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, a diode coupled to said storage condenser for preventing the potential of said storage condenser from being lower than said predetermined value, said blocking oscillator being triggered by a triggering pulse occurring after said predetermined number of counting pulses is stored, and a gate tube having two control grids, one of said grids being coupled to said second source, the other one of said grids being coupled to said storage condenser, said gate tube being normally not conducting and being rendered conducting when said blocking oscillator is triggered, thereby to transmit through said gate tube the triggering pulse which triggers said blocking oscillator.

11. An electronic timing circuit comprising a first source of counting pulses, a charging condenser coupled to said first source, a storage condenser coupled to said charging condenser, means controlled by the voltage across said condensers for discharging said storage condenser by substantially equal voltage increments in response to the counting pulses, a second source of triggering pulses, a device coupled to said storage condenser and to said second source for impressing a predetermined negative potential upon said condensers, said device being rendered operative when the voltage across said storage condenser has reached a predetermined value and being triggered thereafter by the arrival of a triggering pulse, and a gate tube having two control grids, one of said grids being coupled to said second source, means coupled to the other one of said grids for normally rendering said gate tube conductive and for cutting it off when said device is triggered by a triggering pulse, thereby to prevent said gate tube from transmitting said triggering pulse.

12. An electronic timing circuit comprising a first source of counting pulses, a charging condenser coupled to said first source, a storage condenser coupled to said charging condenser, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined negative potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, a diode coupled to said storage condenser for preventing the potential of said storage condenser from being lower than said predetermined value, said blocking oscillator being triggered by a triggering pulse occurring after said predetermined number of counting pulses is stored, and a gate tube having two control grids, one of said grids being coupled to said second source, means coupled to the other one of said grids for normally rendering said gate tube conductive and for cutting it off when said blocking oscillator is triggered by a triggering pulse, thereby to prevent said gate tube from transmitting said triggering pulse.

13. An electronic timing circuit comprising a first source of counting pulses, a charging condenser coupled to said first source, a storage condenser coupled to said charging condenser, a space discharge tube having a control grid and a cathode, said grid and said cathode being individually coupled to said condensers for discharging said storage condenser by substantially equal voltage increments in response to the counting pulses, a blocking oscillator normally biased beyond cut-off and arranged upon being triggered for charging said storage condenser to a predetermined negative potential, said blocking oscillator having a grid coupled to said storage condenser, a second source of triggering pulses coupled to the grid of said blocking oscillator, said blocking oscillator being brought to an operative condition when a predetermined number of counting pulses has been impressed upon said charging condenser, thereby to lower the potential of said storage condenser to a predetermined value, a diode connected across said storage condenser for preventing the potential of said storage condenser from being lower than said predetermined value, said blocking oscillator being triggered by a triggering pulse occurring after said predetermined number of counting pulses is stored, a gate tube having two control grids, one of said control grids being coupled to said second source, and a further space discharge tube having its grid coupled to said storage condenser, the anode of said further space discharge tube being coupled to the other one of the grids of said gate tube for normally rendering said gate tube conductive and for cutting it off when said blocking oscillator is triggered by a triggering pulse, thereby to prevent said gate tube from transmitting said triggering pulse.

LOUIS F. MAYLE.

REFERENCES CITED

The following references are of record in the file of this patent:

UNITED STATES PATENTS

| Number | Name | Date |
|---|---|---|
| 1,927,676 | Bedford | Sept. 19, 1933 |
| 2,113,011 | White | Apr. 5, 1938 |
| 2,420,516 | Bischoff | May 13, 1947 |
| 2,474,040 | Day | June 21, 1949 |

FOREIGN PATENTS

| Number | Country | Date |
|---|---|---|
| 487,982 | Great Britain | June 29, 1938 |